United States Patent
Hermey et al.

(10) Patent No.: US 11,189,995 B2
(45) Date of Patent: Nov. 30, 2021

(54) CONNECTION ARRANGEMENT AND LINE ROUTING DEVICE

(71) Applicant: igus GmbH, Cologne (DE)

(72) Inventors: Andreas Hermey, Hennef (DE); Karl Oskar Lapiere, Troisdorf (DE)

(73) Assignee: IGUS GMBH, Cologne (DE)

( * ) Notice: Subject to any disclaimer, the term of this patent is extended or adjusted under 35 U.S.C. 154(b) by 0 days.

(21) Appl. No.: 16/324,988

(22) PCT Filed: Aug. 11, 2017

(86) PCT No.: PCT/EP2017/070482
§ 371 (c)(1),
(2) Date: Feb. 12, 2019

(87) PCT Pub. No.: WO2018/029355
PCT Pub. Date: Feb. 15, 2018

(65) Prior Publication Data
US 2019/0173269 A1   Jun. 6, 2019

(30) Foreign Application Priority Data

Aug. 12, 2016   (DE) .................... 20 2016 104 470.7

(51) Int. Cl.
*H02G 3/04* (2006.01)
*H02G 3/06* (2006.01)

(52) U.S. Cl.
CPC ......... *H02G 3/0475* (2013.01); *H02G 3/0456* (2013.01); *H02G 3/0608* (2013.01)

(58) Field of Classification Search
CPC ... H02G 3/0475; H02G 3/0456; H02G 3/0608
(Continued)

(56) References Cited

U.S. PATENT DOCUMENTS

| 2,905,201 | A | * | 9/1959 | Mcnaughton | ........ H02G 3/0608 |
| | | | | | 285/419 |
| 3,053,358 | A | * | 9/1962 | Gross | ................... H02G 3/0608 |
| | | | | | 52/696 |

(Continued)

FOREIGN PATENT DOCUMENTS

| AU | 201100502 | 6/2011 |
| AU | 2011100502 | 6/2011 |

(Continued)

OTHER PUBLICATIONS

English translation of International Search Report from corresponding PCT Appln No. PCT/EP2017/070482, dated Nov. 6, 2017.

(Continued)

*Primary Examiner* — Kimberly T Wood
(74) *Attorney, Agent, or Firm* — Grossman, Tucker, Perreault & Pfleger, PLLC

(57) ABSTRACT

A connecting arrangement having connecting elements for connecting two adjacent members of a line guiding device, comprising members which are connected together in a row in the longitudinal direction. The members each have two side wall segments which are arranged spaced in the transverse direction and delimit a receiving space. The side wall segments in the installation position are respectively connected by way of a connecting element to the associated side wall segment of the respectively adjacent member. To simplify the structure, production and assembly and for easier cleaning of the line guiding device it is provided that the connecting elements provided for connecting the side wall segments of two adjacent members are connected together at a mutual spacing by way of a transverse member with the formation of a base unit of the connecting arrangement.

29 Claims, 8 Drawing Sheets

(58) Field of Classification Search
USPC .................. 52/696, 108; 248/49; 59/78.1
See application file for complete search history.

(56) References Cited

U.S. PATENT DOCUMENTS

| | | | |
|---|---|---|---|
| 3,173,521 A * | 3/1965 | Gross ................... | H01R 31/00 403/169 |
| 3,370,121 A * | 2/1968 | Merckle ............... | H02G 3/0608 174/373 |
| 3,382,668 A | 5/1968 | Berkes et al. | |
| 4,077,434 A * | 3/1978 | Sieckert ................. | F16L 23/14 138/92 |
| 4,962,639 A | 10/1990 | Blase | |
| 5,014,506 A | 5/1991 | Moritz | |
| 5,038,556 A | 8/1991 | Moritz et al. | |
| 5,220,779 A | 6/1993 | Tatsuta et al. | |
| 6,423,901 B2 * | 7/2002 | Richter ................. | F16G 13/16 174/135 |
| 6,450,458 B1 * | 9/2002 | Bernard ............... | H02G 3/0608 248/68.1 |
| 6,725,642 B2 * | 4/2004 | Tsutsumi ............... | F16G 13/16 248/49 |
| 6,745,555 B2 * | 6/2004 | Hermey ................. | F16G 13/16 248/49 |
| 7,204,075 B2 | 4/2007 | Utaki | |
| 7,845,155 B2 * | 12/2010 | Jaeker ................... | H02G 11/00 59/78.1 |
| 8,413,416 B2 * | 4/2013 | Egami ................... | F16G 13/16 59/78.1 |
| 2003/0155148 A1 * | 8/2003 | Lockard ............... | H02G 3/0608 174/68.1 |
| 2006/0112671 A1 | 6/2006 | Blase et al. | |
| 2012/0045277 A1 | 2/2012 | Sumida et al. | |
| 2012/0068024 A1 * | 3/2012 | Wurzer ................ | H02G 3/0406 248/49 |
| 2016/0069422 A1 | 3/2016 | Hermey et al. | |

FOREIGN PATENT DOCUMENTS

| | | | |
|---|---|---|---|
| CN | 1831369 | 9/2006 | |
| CN | 101680510 | 3/2010 | |
| CN | 102141115 | 8/2011 | |
| CN | 202790326 | 3/2013 | |
| DE | 1474230 | 1/1971 | |
| DE | 1615984 B1 * | 8/1971 | .......... H02G 3/0608 |
| DE | 19740967 | 4/1999 | |
| DE | 20107003 | 10/2002 | |
| DE | 202004005801 | 7/2004 | |
| DE | 102006011229 | 9/2006 | |
| DE | 102007017940 | 10/2008 | |
| EP | 2159890 A1 * | 3/2010 | .......... H02G 3/0456 |
| EP | 2846428 A1 * | 3/2015 | .......... H02G 3/0437 |
| GB | 2314216 A * | 12/1997 | ............... F16L 3/26 |
| JP | 2-250621 | 10/1990 | |
| JP | 2-503943 | 11/1990 | |
| JP | 5-12803 | 2/1993 | |
| JP | 3-92644 | 4/1997 | |
| WO | WO-2017147256 A1 * | 8/2017 | .......... H02G 3/0608 |

OTHER PUBLICATIONS

English translation of International Preliminary Report on Patentability from corresponding PCT Appln. No. PCT/EP2017/070482, dated Feb. 12, 2019.
Office Action from related Chinese Appln. No 201780063284.0, dated Apr. 3, 2020. English translation of the search report attached.
English translation of Office Action from related Japanese Appln. No. 2019-505527, dated Mar. 10, 2020.

* cited by examiner

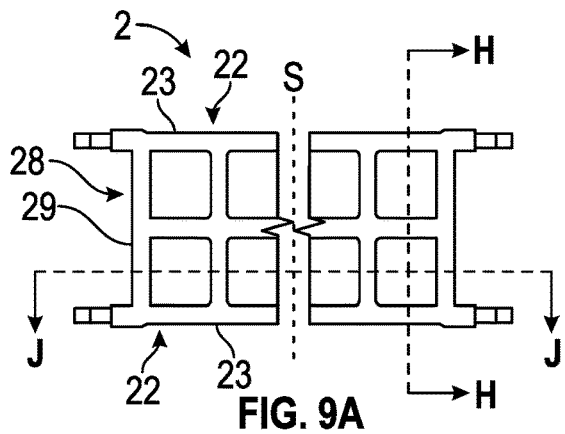
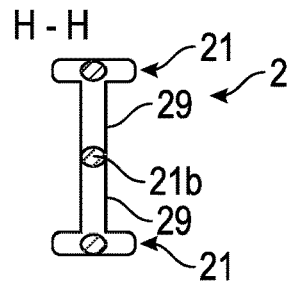
FIG. 9A  FIG. 9B
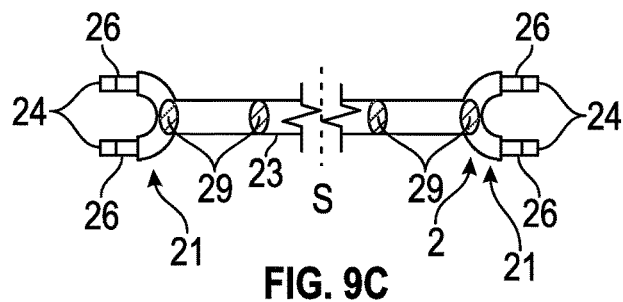
FIG. 9C
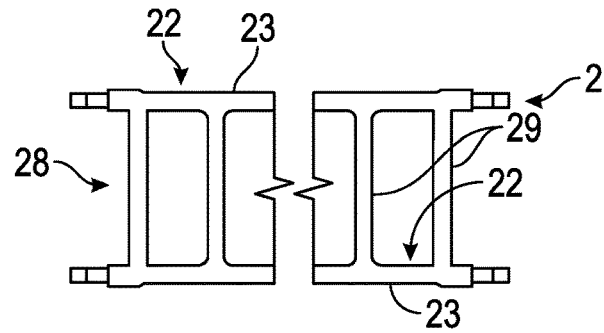
FIG. 10A
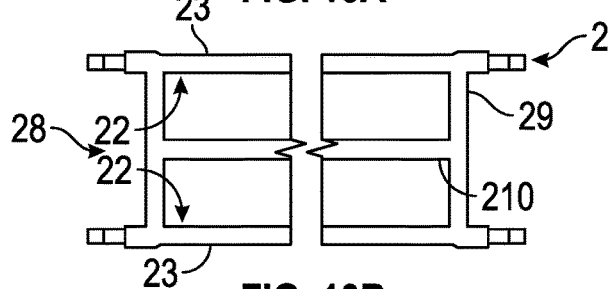
FIG. 10B
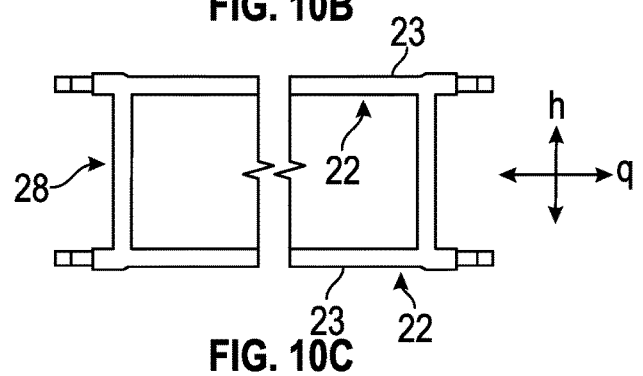
FIG. 10C

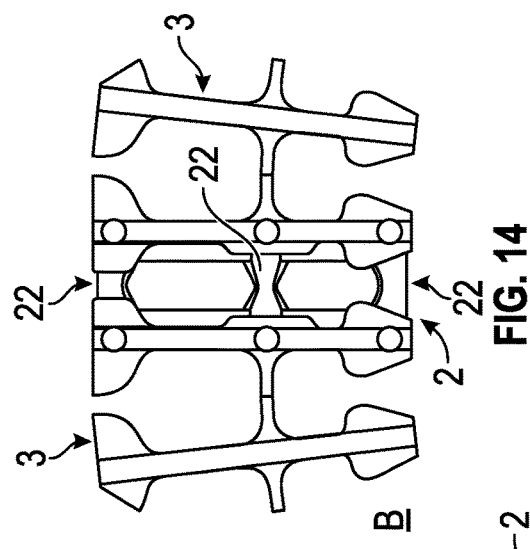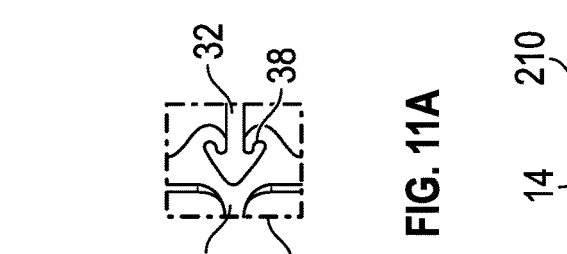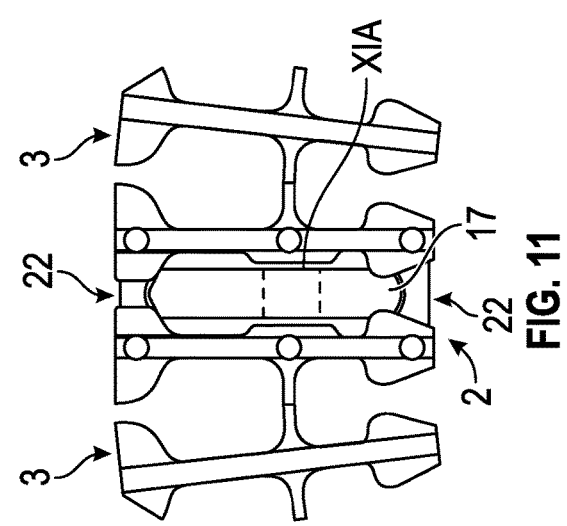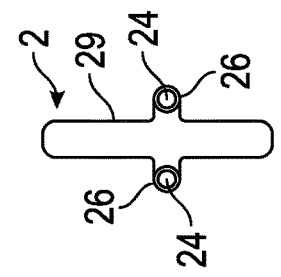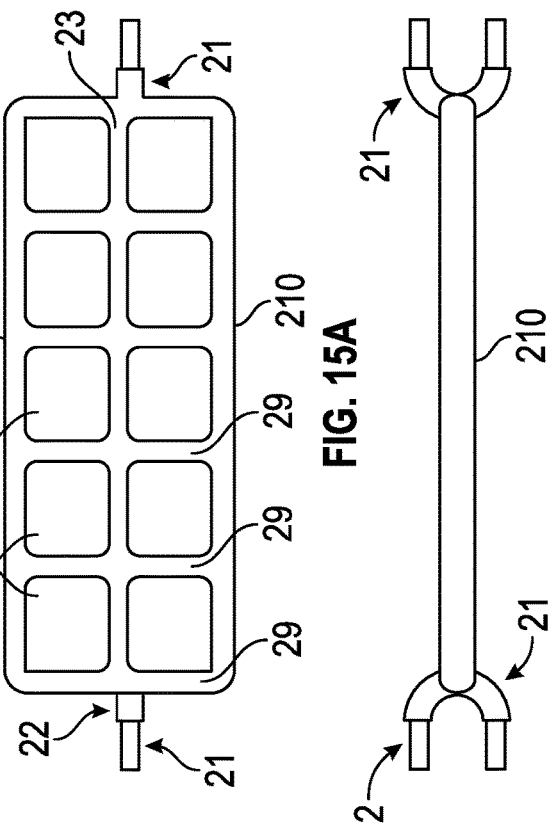

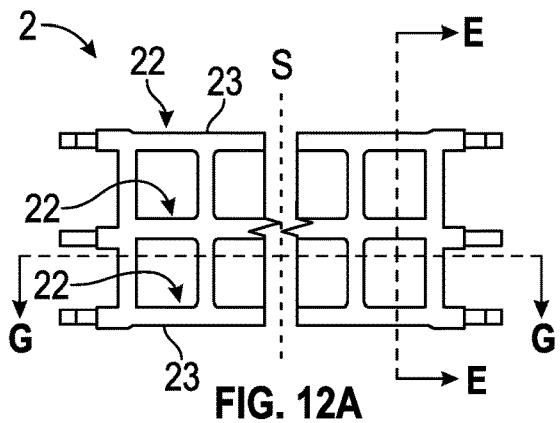
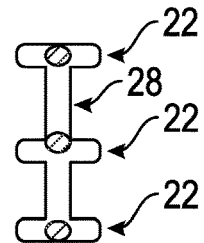
FIG. 12A  FIG. 12B
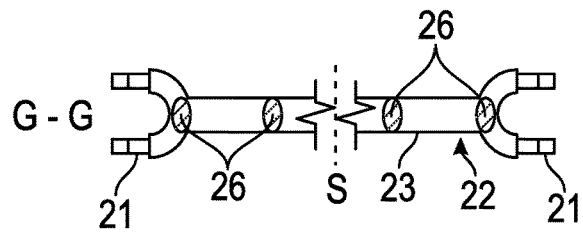
FIG. 12C
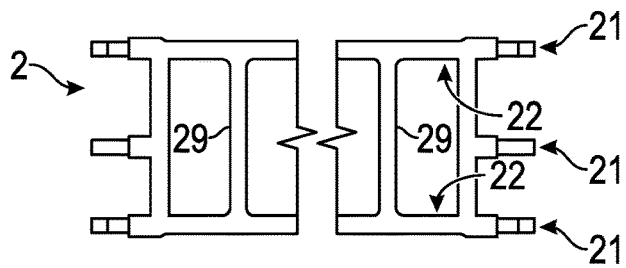
FIG. 13A
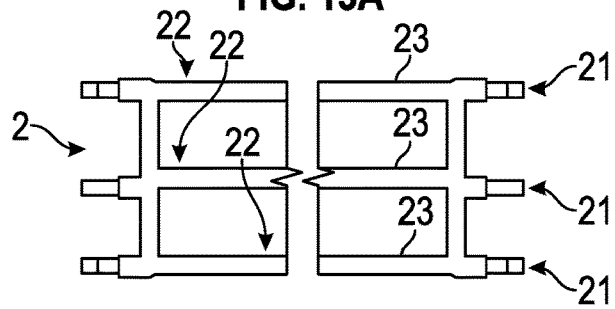
FIG. 13B
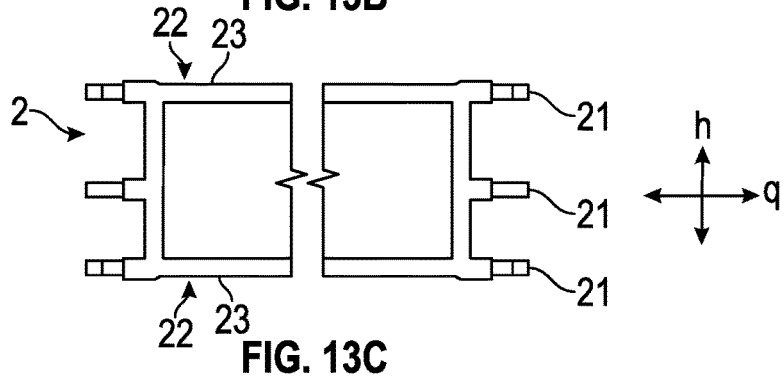
FIG. 13C

CONNECTION ARRANGEMENT AND LINE ROUTING DEVICE

FIELD

The invention concerns a connecting arrangement comprising connecting elements for connecting two adjacent members of a line guiding device for guiding hoses, cables or the like, comprising members which are connected together in a row in the longitudinal direction, wherein the members respectively have two side wall segments which are arranged spaced in the transverse direction and which delimit a receiving space as part of a line guiding passage for the hoses, cables or the like and the side wall segments in the installation position are respectively connected by way of a connecting element to the associated side wall segment of the respectively adjacent member. The invention further concerns a line guiding device having the connecting arrangement.

BACKGROUND

A connecting arrangement of the general kind set forth as well as a line guiding device having the connecting arrangement of the general kind set forth are known from DE 10 2007 017 940 A1 and DE 201 07 003 U1. However, they are complicated and expensive in structure, in production and in assembly. In addition, they are difficult to clean.

An object of the invention is to provide a connecting arrangement of the general kind set forth and a line guiding device having the connecting arrangement of the general kind set forth, which is easier to construct, produce and assemble. In addition, the invention seeks to make the cleaning thereof easier.

SUMMARY

The specified object is attained in particular in that the connecting elements provided for connecting the side wall segments of two adjacent members are connected together at a mutual spacing by way of a transverse member with the formation of a base unit of the connecting arrangement.

That arrangement of the connecting elements connected together by way of the transverse member forms a base unit. The spacing in the longitudinal direction of the transverse member of the connecting elements for connecting the side wall segments of adjacent members can be equal to the spacing at which those connecting elements of a connecting arrangement of the general kind set forth are arranged relative to each other in the installation position in a conventional line guiding device. That is implicitly afforded by the fact that the connecting elements are provided for connecting the side wall segments of adjacent members. The adjacent members can be connected together by way of the connecting elements in a connecting position. The side wall segments can each be of a one-piece construction.

Therefore, various functions can be performed by means of the base unit: on the one hand adjacent members of the line guiding device can be connected together in particular solely by way of connecting elements, at their side wall segments. On the other hand, the side wall segments which are adjacent in the transverse direction of the line guiding device can be connected together by means of the base unit in spaced relationship by way of the transverse member of the connecting pair. The base unit can serve in particular for connection in the longitudinal direction of the line guiding device of adjacent side wall segments and in addition for connection in the transverse direction of the line guiding device of adjacent side wall segments.

The base unit can thus perform the function of a transverse limb and that of the connecting elements. It can be fitted at least at some locations in the line guiding device or overall instead of the usual transverse limbs. It is possible to make a saving on those transverse limbs. A line guiding device with such base units can thus involve markedly fewer components. The line guiding device can be substantially simplified in regard to structure, production and assembly. At the same time cleaning of the connecting arrangement can be made easier by virtue of the reduction in the number of components.

In addition, the base units can laterally delimit and/or subdivide the receiving space.

In addition, in a line guiding device having the base units and without transverse limbs, the number of connecting locations is reduced, more specifically by the connecting locations of the usual transverse limbs in relation to the side wall segments. In general terms contaminating dirt can more easily cling to the connecting locations, and in turn is difficult to remove. The reduction in the connecting locations at the same time involves easier cleaning of the line guiding device.

A connecting element can be provided for each side wall segment of the members. The connecting elements of the base unit are preferably fixedly, in particular integrally, connected to the transverse member. The base unit can be advantageously simply of a one-piece structure. In principle the side wall segments of two adjacent members can be arranged in the connecting position such as to be connected together exclusively by way of at least one base unit.

If, as is frequently the case, there are for each member only two in particular parallel side wall segments each with a respective connecting element, the two connecting elements can connect the side wall segment to the adjacent side wall segment of the member which is adjacent in the longitudinal direction of the line guiding device.

If the members have more than two side wall segments, for example two outer side wall segments and a side wall segment arranged between them in the transverse direction, then there can be at least one connecting element per side wall segment. With three side wall elements the base unit can have three connecting elements, connected together in mutually spaced relationship by way of a common transverse member. Alternatively, there can also be two base units. In that case the central side wall segment can be connected for example by way of two connecting elements to the associated central side wall segment respectively of the adjacent member and the two connecting elements, in each case in the form of part of one of the two base units, can be connected by way of a transverse member to the associated outwardly arranged connecting element.

In the position of installation in the line guiding device, the connecting elements which are aligned in the transverse direction in relation to the line guiding device can be connected together in spaced relationship by way of the transverse member. The spacing can be in particular such that the receiving space is completely bridged over by the transverse member.

Mutually associated side wall segments of the adjacent members can be arranged in mutually adjoining relationship, in particular in mutually aligned relationship, with respect to the longitudinal direction of the line guiding device, by way of the connecting elements. In particular they can adjoin each other at their ends. In particular it is not provided that they laterally overlap each other. Overlapping would make it markedly more difficult to clean the line guiding device.

Side wall segments which are adjacent in the transverse direction are arranged in preferably mutually aligned relationship, with respect to the transverse direction. They are moved synchronously upon movement of the line guiding device.

In a development of the connecting arrangement, which is advantageous in respect of force mechanics and structure, the connecting elements of the base unit are arranged in mirror-image symmetrical relationship with each other with respect to a mirror-image symmetry plane which is central and perpendicular relative to the longitudinal extent of the transverse member. In particular the connecting elements are arranged oriented in mirror-image symmetry with each other. For simplicity of manufacture the transverse member and the connecting elements can be arranged in a common plane.

Also, advantageous in terms of structure and force mechanics, the transverse member can be arranged to extend from a central region of the connecting elements with respect to an extent of the connecting elements perpendicularly to the longitudinal extent of the transverse member. In particular the transverse member can be disposed precisely centrally or with a deviation of a maximum of 30%, in particular a maximum of 10% or 5% of the extent of the connecting elements in the longitudinal direction of the line guiding device.

In a structure in which the transverse member centrally engages the connecting elements they can have two free ends. In that case the connecting elements, at their free ends, can have respective first connecting means for connection of the base unit to second connecting means provided on the side wall segments.

The connecting elements of the base unit can each be of a flat, in particular linear basic shape extending transversely relative to the transverse member. In particular the base unit can be of a flat level shape. It can extend in a plane which is axial-radial with respect to the longitudinal extent of the transverse member. In advantageous fashion for improved engagement of the force of the connecting elements to the respectively associated side wall segments, the connecting elements of the base unit can be of a U-shaped basic form, with two preferably identical limbs. The limbs can be arranged in the longitudinal extent of the transverse member and/or facing away from same, to facilitate assembly and to afford advantages in terms of force mechanics.

The parts of the base unit, that is to say connecting elements and/or transverse member, can each be of a round cross-section. That permits reduced friction on cables and hoses upon a possible relative movement thereof with respect to the base unit in the installation position in the line guiding device. In addition, as a result the base unit is less susceptible to dirt and easier to clean. In particular the transverse member of the base unit can be of an oval cross-section with a larger diameter parallel to a plane defined by the transverse member and the connecting elements. That can achieve improved torsional stiffness for the base unit with respect to that plane.

The base unit can be in one piece, to simplify assembly and production. In particular the connecting elements of the base unit can be connected to the transverse member in material-bonded relationship.

The base unit can be in the form of an injection molding of a material, in particular a plastic material. Alternatively, the transverse member, in particular alone, can be made for example from a less elastic to hard-elastic material than the material of the connecting elements, whereby the transverse member can be designed to be stiffer in respect of bending and/or torsion than connecting elements. That would have the advantage that the connecting elements can preferably be designed to be slightly elastically bendable while the transverse member still remains flexurally and torsionally stiff. In that case the connecting elements can be injection-molded to the transverse member for example by means of a 2-component injection molding process.

In a development of the connecting arrangement there can be at least two base units which are arranged in mutually spaced relationship perpendicularly to the transverse direction. Advantageously in terms of structure and force mechanics, the transverse members of the two base units are arranged parallel to each other. That spacing can be perpendicular in the installation position in the heightwise direction in relation to the transverse direction and to the longitudinal direction of the line guiding device.

The base unit and in particular its transverse member can be structurally reinforced to improve torsional stiffness. In particular for reinforcement purposes the arrangement can have a bar framework adjoining the transverse member and/or the connecting elements. The bar framework can connect to the base unit, in particular the transverse member thereof, or can be integrated into the base unit. The bar framework can be of a frame-like configuration. It can be in the form of a flat bar framework. The bar framework can be arranged to extend in particular in a plane which is axial relative to the longitudinal extent of the transverse member.

In a development of the connecting arrangement the two base units can be connected fixedly together by way of a structure, in particular by way of the bar framework. Base units and bar framework can delimit or divide the receiving space defined by the side wall segments for the hoses, cables or the like. In particular the bar framework extends as a flat or planar bar framework in a plane defined by the two base units.

In an advantageously simple structure the bar framework can have at least one bar framework limb which connects the base units, in particular the transverse members, together, in particular fixedly. Advantageously in terms of force mechanics the one bar framework limb can be arranged to centrally engage the transverse members. Preferably the one bar framework limb extends transversely relative to the longitudinal extent of the transverse member, in the installation position in the line guiding device in a heightwise direction thereof perpendicularly to the longitudinal direction and the transverse direction thereof.

The bar framework can have further bar framework limbs arranged at an angle or parallel to the transverse members. The bar framework limbs, alone or together with the transverse members, can divide the receiving space into individual compartments.

Advantageously in regard to production and assembly the base units and the bar framework can be in the form of a one-piece component. Base units and bar framework can be connected together in particular in material-bonded relationship. The two can be produced by means of injection molding, preferably from plastic.

To completely attain the object of the invention the line guiding device can be provided for guiding hoses, cables or the like in a line guiding passage, wherein the line guiding device has members which are connected together and arranged in a row in the longitudinal direction and the members include two side wall segments which are arranged spaced in the transverse direction and define the line guiding passage. The side wall segments are respectively connected together with the associated side wall segment of the adjacent side wall segment by means of the connecting arrangement in accordance with an embodiment as described hereinbefore and/or hereinafter. The connecting arrangement includes at least one base unit with connecting elements which are provided for connection of the side wall segments of adjacent members and which are connected together, spaced from each other by way of a transverse member. The connection of the side wall segments of adjacent members is in particular releasable. The line guiding device can have the transverse direction and the heightwise direction arranged perpendicularly thereto, wherein the heightwise direction and the transverse direction are arranged perpendicularly to the longitudinal direction. The transverse direction of the line guiding device can be at least approximately equal to the longitudinal extent of the transverse member in the installation position in the line guiding device.

In an advantageously simple embodiment of the line guiding device the transverse member of the at least one base unit can extend in the transverse direction of the line guiding device. In particular the transverse member can be arranged between the two members connected by the base unit.

To stabilise the line guiding device the line guiding device, with respect to the heightwise direction perpendicularly to the transverse direction and to the longitudinal direction, can have a base unit in a central region, a base unit in a lower region and/or a base unit in an upper region. With respect to the heightwise direction, there can be a base unit centrally, a base unit upwardly and/or a base unit downwardly.

In an advantageous simple embodiment of the line guiding device the connecting elements can respectively be arranged to interconnect the adjacent side wall segments at the ends in positively locking and/or frictionally locking relationship. No additional means like screws or the like are required for the connection. In particular a simple plug-in and/or latching connection is preferred.

As stated above the connecting elements of the base unit can respectively have two free ends having first connecting means for connection to second connecting means of the respectively associated side wall segment.

In an embodiment of the line guiding device the first connecting means can be in the form of end thickened portions, in particular of a ball-like or cylinder-like or barrel-like configuration. In the case of the elongated shape of the connecting elements, as already described hereinbefore, the end thickened portions can provide for forming a barbell-like shape. In an embodiment of the line guiding device which is an alternative and which is deemed to be advantageous the free ends of the connecting elements can each be in the form of plug-in projections. Advantageously in terms of force mechanics those projections can extend in the transverse direction. That applies in particular to the connecting elements as already described hereinbefore of a U-shaped basic form with preferably two limbs.

In both cases the free ends can engage into a receiving opening associated therewith and provided as a second connecting means on the side wall segment and being open in the transverse direction. In that case the inside contour of the receiving opening can be matched to the outside contour of the respectively associated first connecting means. In the case of a plug-in connection by means of the plug-in projections the projections can be of a preferably slightly conically converging configuration. Slightly conical is used to mean conically converging at an angle of less than 60°, in particular less than 30° or 15°. It will be appreciated that reversal of the means is also an option by the first connecting means being arranged on the side wall segments and the second connecting means on the connecting elements.

The line guiding device can be displaceable in the usual way around a direction-changing arc, thus forming guide runs. In an advantageous embodiment of the line guiding device the side wall segments can be of a flexibly bendable configuration. That has the advantage that the side wall segments can at least contribute to bending and thus to the formation of a direction-changing arc upon displacement of the line guiding device. In addition, the side wall segments can be of a suitably greater axial length, whereby the number of members per unit of length and thus the number of locations at which the members are connected together can be correspondingly reduced. That can simplify the construction of the line guiding device.

In particular it can be provided that the side wall segments are designed to be flexibly bendable at least in a bending plane perpendicularly to the transverse direction of the line guiding device.

In particular the adjacent members can be arranged to be fixedly connected together with respect to the bending plane.

For the above-described situation where there is only one base unit for connecting the two members then that connection can also be in the form of a pivotal connection for relative pivotability of the two members in the bending plane.

In a further advantageous embodiment of the line guiding device the adjacent members of the line guiding device are arranged held at a preferably constant spacing relative to each other with respect to the longitudinal direction. In that way a free space can be formed between the side wall segments which are adjacent in the longitudinal direction. The spacing of the members has the advantage that it is more difficult for dirt particles to get in between the members in operation and the members are easily accessible at the ends for cleaning purposes. The constant spacing can also be referred to as a fixed spacing. Upon proper displacement of the line guiding device that constant spacing can also always remain unchanged when passing over a direction-changing arc. The result of this is that no pivotal movement of the members, but flexible bending of the side wall segments, is involved in forming the direction-changing arc. In that way bending of the line guiding device for constituting the direction-changing arc, apart from possible slight elastic deformation of the connecting elements of the base units, can occur solely by way of bending of the side wall segments. The bending axis can be oriented parallel to the transverse direction.

Preferably bending to form a bending radius in a first bending direction and to provide a self-supporting length in a second direction in opposite relationship to the first bending direction is delimited by an abutment.

The preferably constant spacing of the adjacent members can be implemented for example by way of the connecting elements or the spacing of the free ends thereof and/or by way of spacer elements, for example by way of abutments on the members, that are operative in the longitudinal direction. The spacing can be for example less than 30%, preferably less than 15% or less than 5% of the axial length of a side wall segment. The spacing can correspond approximately or identically to the thickness of the transverse limb in the longitudinal direction or said thickness with a deviation of up to 80% or up to 50%.

In this connection attention is directed in particular to DE 10 2007 017 940 A1. That publication describes a flexibly bendable side wall segment, the features of which, that relate to the fundamental structure, in particular in respect of the structural measures for flexible bending of the side wall segment, can be adopted here for side wall segments of the line guiding device according to the invention. Therefore, the disclosure of DE 10 2007 017 940 A1 with respect to the features regarding the fundamental structure in relation to the structural measures for flexible bending of the side wall segment is incorporated into the disclosed content of the present application.

As described in DE 10 2007 017 940 A1 the side wall segments can each have a connecting limb which is flexible in the bending plane. Bending thereof is limited by side portions which are arranged thereon at the underside and/or the top side, preferably in one piece therewith, having abutments which face in the longitudinal direction and which can be moved against each other to limit the bending movement. In that case the abutments can engage into each other in the form of a plug-in connection.

In an advantageous embodiment of the line guiding device the side wall segments can each be made from side wall members which are pivotably connected together and which each have two oppositely disposed side portions, wherein they are connected pivotably in the bending plane to the immediately adjacent side portions and have the abutments for limiting a bending angle, wherein a plurality of interconnected side portions form the side wall segment.

The connecting limb can be arranged at the edge with respect to height, in particular inwardly with respect to the direction-changing arc. Advantageously in terms of force mechanics the connecting limb can be arranged in a central region of the side wall segment in relation to height.

For the above-described situation where a base unit is arranged centrally with respect to height for connecting two adjacent members, it is advantageous in regard to the transmission of force in the longitudinal direction for it to be arranged at the height of the connecting limb. That applies even when there is only one base unit at all. As described above the members can be pivotably movably connected together in the bending plane by way of that then only one base unit.

For further stabilization and in particular increasing the tensile strength of the line guiding device it can be provided that disposed at the end of the connecting limb are third connecting means, in particular in the form of plug-in elements, by way of which the side wall segments of adjacent members are respectively in particular pivotably connected together.

BRIEF DESCRIPTION OF THE DRAWINGS

The present invention is described in greater detail hereinafter by means of a number of embodiments of the guide means, as illustrated in the drawing, without the invention however being limited thereto. In the drawings:

FIGS. 9a through 9c each show a view of a further embodiment of the connecting arrangement with two base units;

FIGS. 10a through 10c each show a side view of a further embodiment of the connecting arrangement with two base units;

FIGS. 11 and 11a show a side view of the connecting arrangement of FIGS. 10a through 10b in the engagement position between two side wall segments and a cut-out portion as shown in FIG. 11, but with another configuration of the connecting arrangement;

FIGS. 12a through 12c each show a view of a further embodiment of the connecting arrangement with three base units;

FIGS. 13a through 13c each show a side view of a further embodiment of the connecting arrangement with three base units;

FIG. 14 shows a side view of the connecting arrangement of FIGS. 13a through 13b in the engagement position between two side wall segments;

FIGS. 15a through 15c each show a side view of a further embodiment of the connecting arrangement with one base unit;

DETAILED DESCRIPTION

Figure 1:
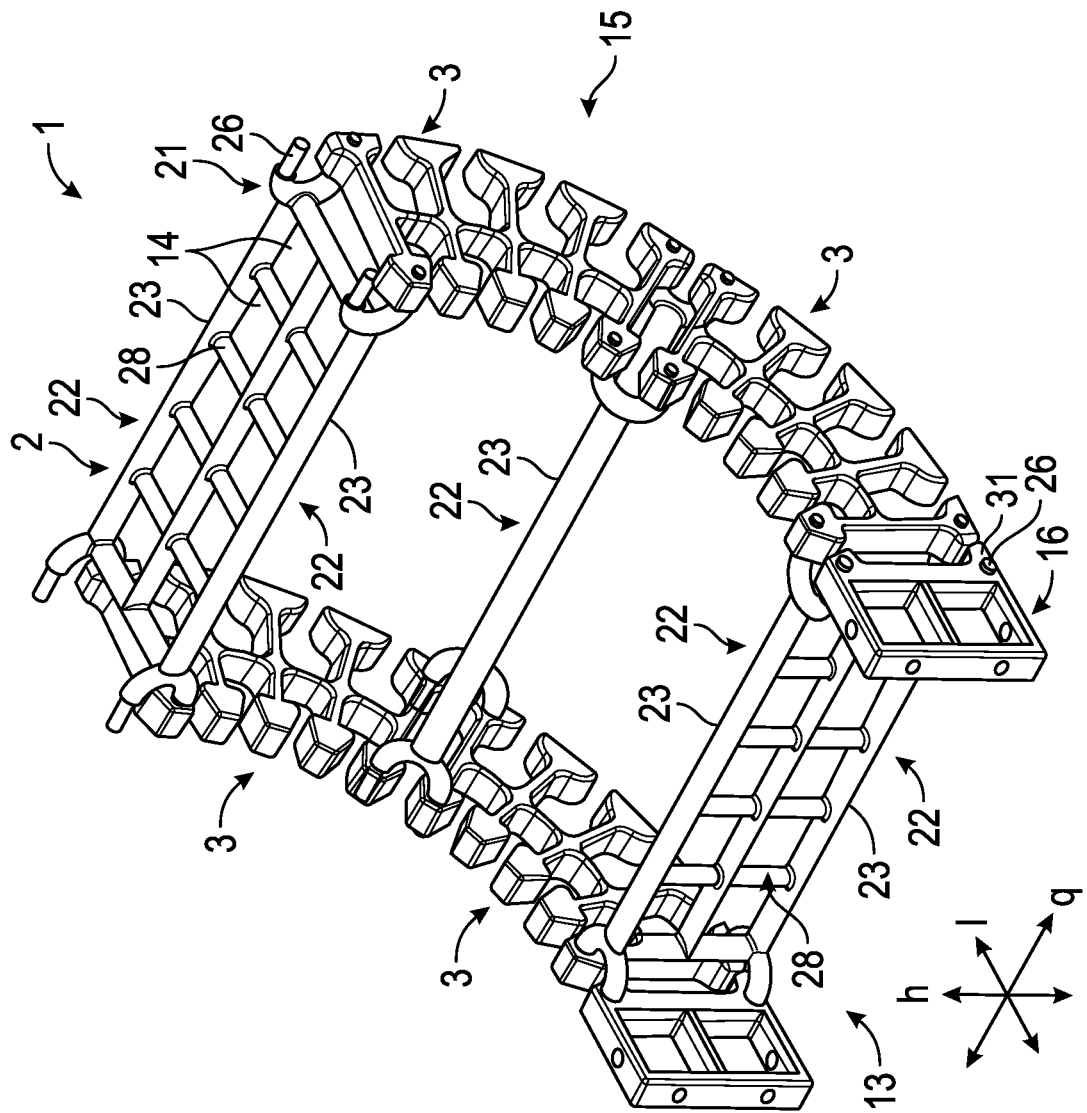
FIG. 1 shows a perspective view of an embodiment of a line guiding device with side wall segments and base units connecting same as part of a connecting arrangement.
Figure 3:
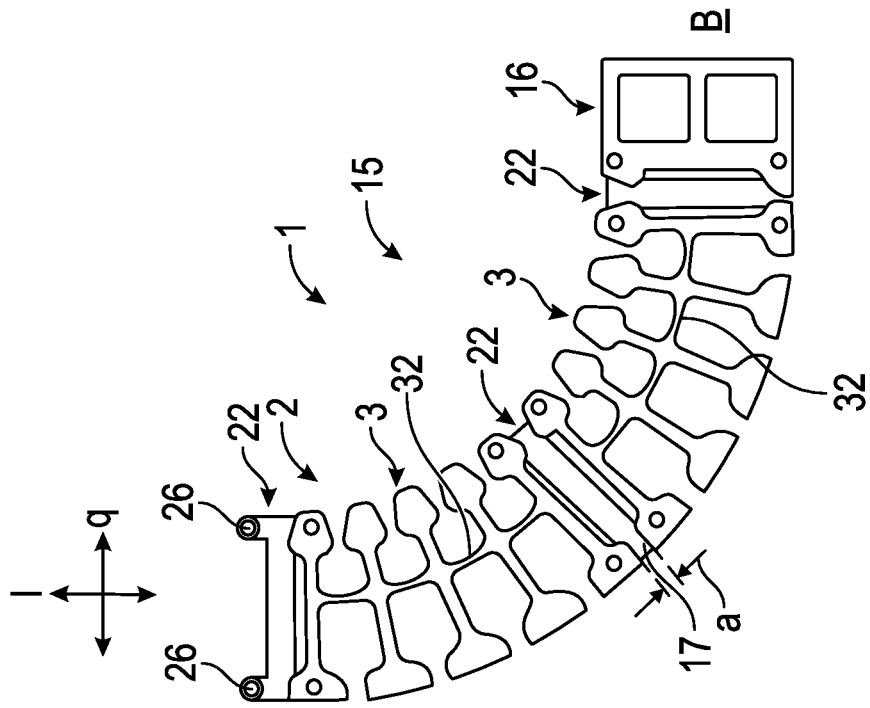
FIGS. 2 and 3 each show a side view of the line guiding device of FIG. 1.
Figure 2:
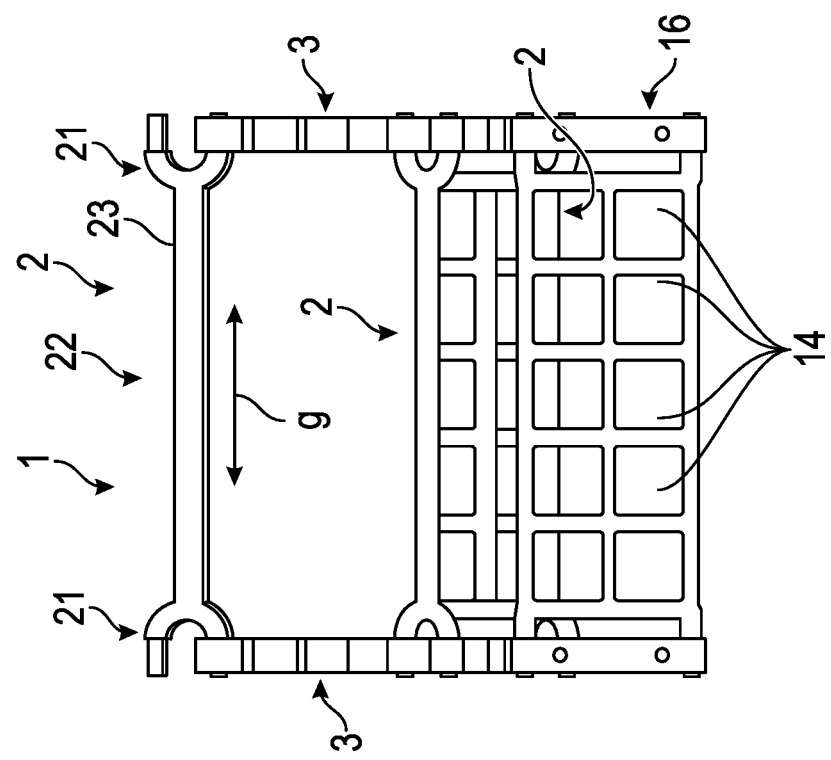
Figure 4:
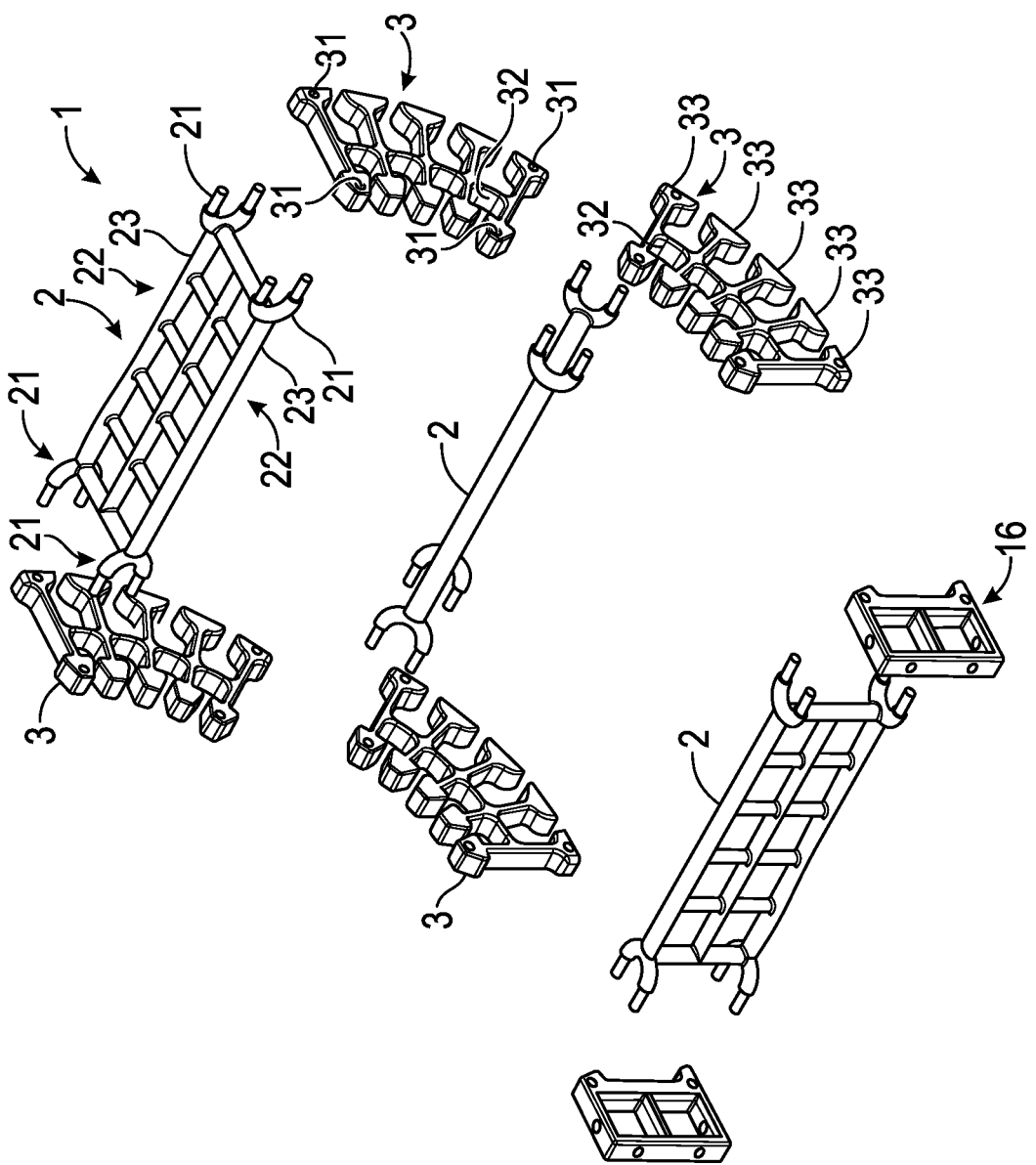
FIG. 4 shows an exploded view of the line guiding device of FIG. 1.

In the description hereinafter, all terminology relating to description of location like up, down, front, rear, right and left are intended as they are shown in the respective Figure itself, unless otherwise defined.

FIGS. 1 through 17 show various views, sectional views and partial views of different embodiments of a line guiding device 1 with a connecting arrangement 2 according to the invention consisting of members 12 connected together in a row in the longitudinal direction. The connecting arrangement 2 has connecting elements 21 for the connection of two adjacent members 12 of the line guiding device 1 for guiding lines, hoses, cables and/or the like (not shown here). The members 12 respectively include two side wall segments 3 which are arranged spaced in the transverse direction q and which define a receiving space 13 for the lines, hoses, cables and/or the like. The side wall segments 3 of a member 12 in the installation position are respectively connected to the associated side wall segment 3 of the adjacent member 12 by way of at least one connecting element 21.

The particular configuration of the connecting arrangement 2 or the line guiding device 1 provides that the connecting elements 21 provided for connecting the side wall segments 3 of two adjacent members 12 are fixedly connected together in mutually spaced relationship by way of a transverse member 23, with the formation of a base unit 22 of the connecting arrangement 2. The base unit 22 is shown in an individual view in FIG. 7. In the installation position the transverse member 23 extends in the transverse direction q of the line guiding device 1. In principle the side wall segments 3 of two adjacent members 12 are connected together solely by way of at least one base unit 22.

As shown in FIGS. 1 through 4 the receiving space 13 is completely bridged over in the transverse direction q by the base units 22. It is not only the side wall segments 3, aligned in the longitudinal direction, of two adjacent members 12, that are connected together by means of the base unit 22. In addition, in performing a transverse limb function, the side wall elements 3 which are aligned in the transverse direction are also connected together so that it is possible to save on corresponding transverse limbs. That permits better accessibility for cleaning the line guiding device 1. In addition, the number of components required for constructing the line guiding device 1 is reduced. In addition, production and assembly of the line guiding device 1 are simplified.

Moreover, the side wall segments 3 in the non-loaded state here are of a curved shape which however is not necessary for the invention. That can be clearly seen in particular from FIG. 4. The curved shape of side wall segments 3 is already described in DE 10 2007 017 940 A1, to which reference is also directed in this connection. As a result of the curved shape the side wall segment 3 builds up a spring-elastic pre-stressing upon bending towards straightening and towards a greater curvature.

The base unit 22 here is in one piece, more specifically being produced in the form of a single injection molding of plastic material. The number of components is further reduced insofar as here the arrangement no longer uses, as is usual, individual connecting elements, but connecting elements 21 which are combined together by way of the base unit 22. Any reduction in the number of components also contributes to improved cleaning.

Figure 7:
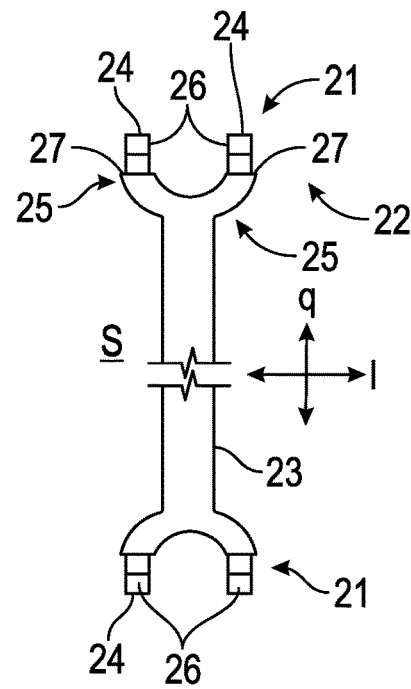
FIG. 7 shows a plan view of an embodiment of the base unit.
Figure 8:
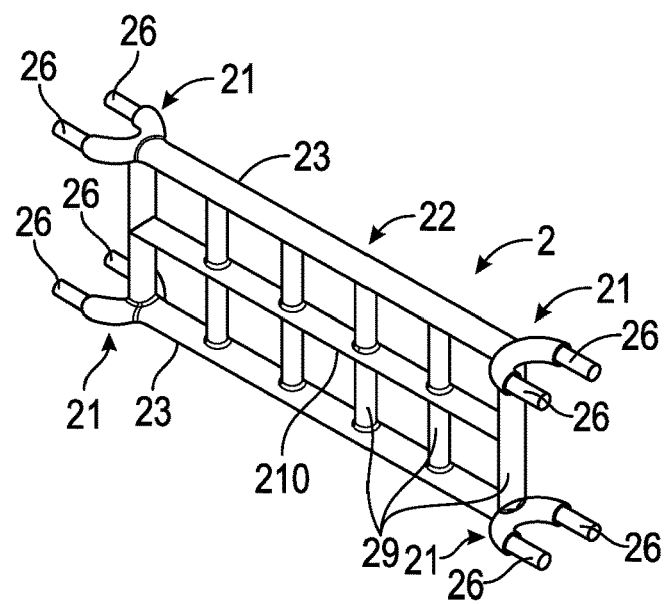
FIG. 8 shows a perspective view of the embodiment shown in FIG. 1 of the connecting arrangement with two base units.

As shown in FIG. 7 the connecting elements 21 are arranged and oriented in mirror-image symmetrical relationship with each other with respect to a central mirror-image plane of symmetry S (shown in FIG. 7) which is perpendicular to the longitudinal extent of the transverse member 23. The transverse member 23 respectively centrally engages the connecting elements 21, with respect to an extent of the connecting elements 21 perpendicularly to the longitudinal extent of the transverse member 23, so that the connecting elements 21 respectively extend with two free ends 24 away from the transverse member 23. In the embodiments illustrated here the connecting elements 21 are each of a U-shaped basic form with two mutually parallel limbs 25 arranged to extend away from the transverse member 23 in the longitudinal extent thereof.

The limbs 25 at their ends are here in the form of slightly conically converging plug-in projections 26, to provide first connecting means. As can be seen for example from FIG. 1 the projections 26 each engage into an associated receiving opening 31 which is provided on the side wall segment 3 in question as the second connecting means, wherein the respective limb 25 bears against the edge of the receiving opening 21 by way of an abutment 27. In that way a connection is produced between the connecting element 21 and the associated side wall segment 3, which connection is positively locking with respect to the longitudinal direction 1 of the line guiding device 1 and is frictionally locking with respect to the transverse direction q of the line guiding device 1. It is immediately apparent that such a plug-in connection can be easily implemented even for unskilled people. The receiving opening 21 is in the form of a through opening with an axis parallel to the transverse direction q.

Except for the embodiment of the line guiding device 1 shown in FIG. 15 the side wall segments 3 of a member 12 are respectively connected to those of the adjacent member by way of at least two base units 22 which are arranged in mutually spaced parallel relationship in the heightwise direction h, in the line guiding device 1. The base units are connected together in spaced relationship by way of a flat bar framework 28. They are integrally connected together. That bar framework 28 is disposed in a plane defined by the two base units 22.

Various embodiments by way of example of the connecting arrangement 2 with different bar frameworks 28 with two base units 22 are shown in FIGS. 9a through 9c and 10a through 10c, and with three base units 22 in FIGS. 12a through 12c and 13a through 13c, wherein, as a man skilled in the art can readily see, further variations in the nature of the bar framework and in the number of base units are also possible here. In all cases the base units 22 and the bar framework 28 form an integral component of plastic injection molding. It can be clearly seen that the base units 22 and the bar framework 28 delimit the receiving space 13 or subdivide same into individual compartments 14.

In the embodiments illustrated here the bar framework 28 has at least two bar framework limbs 29 extending in the heightwise direction (FIG. 10c). They respectively engage the end of the transverse members 23. With the transverse members 23 they form an outer frame which delimits the receiving space 13. For further stabilization in the embodiment of the connecting arrangement 2 shown in FIG. 10b the bar framework 28 is enlarged by a transverse member 210 without end connecting elements. As shown in FIG. 10a the arrangement has a plurality of bar framework limbs 29 arranged equally spaced over the transverse direction q. As shown in FIG. 9a in combination with the embodiments of the connecting arrangement 2 shown in FIGS. 10a and 10b, there is here a bar framework 28 with bar framework limbs 29 and a transverse member 210.

The structure of the connecting arrangement 2 shown in FIGS. 12a-12c and 13a-13b is of a similar configuration, wherein here instead of the transverse member 30 there is an additional base unit 22 which in turn engages with its connecting elements 21 in a central region on the associated side wall segments 3. Thus, there are three base units 22, that is to say a lower base unit 22, a central base unit 22 and an upper base unit 22, connected together by way of bar framework limbs 29.

As can be seen in particular from the sectional views in FIGS. 9b, 9c, 12b and 12c, the base unit 22 and the bar framework 28 are each of a round cross-section, wherein the cross-section of the transverse member 23 of the base units 22 and the bar framework 28 is oval with a larger diameter in the longitudinal direction 1 of the line guiding device 1. That improves the torsional stiffness of the component and thus the stability of the line guiding device 1.

As can be seen in particular from FIGS. 1, 3, 11 and 14 the adjacent members 12 of the line guiding device 1 are held at least at a constant spacing a relative to each other with respect to the longitudinal direction 1 of the line guiding device 1, with the formation of a free space 17 between the side wall segments 3 adjacent in the longitudinal direction 1. In that way it is possible for the ends of the members 12 also to be effectively cleaned. In addition, the stability of the line guiding device 1 is improved.

This means at the same time that, at that location, no bending of the line guiding device 1 or no pivotal movement of the adjacent members 12 can take place if possible slight elastic deformation due to the material involved within the line guiding device 1 can be ignored. To provide for a bending movement of the line guiding device 1, for example upon displacement of the line guiding device 1, with the formation of a direction-changing arc 15 indicated here in FIGS. 1 through 3, it is provided here that the side wall segments 3 are elastically bendable with respect to a bending plane B perpendicularly to the transverse direction q. In that case the bending plane B is equal to the plane of the drawing in FIGS. 3, 6, 11, 14, 17*a* and 17*b*.

This constant spacing is achieved structurally here by virtue of the fact that, when at least two identical base units 22 are used for connecting adjacent members 12, half the distance of the plug-in projections 26 in the longitudinal direction 1 is greater than the distance of the receiving opening 31 relative to the end of the respective side wall segment 3.

The transverse member 23 of the respective base unit 22 is disposed between the two members 12. That results from the geometry already described hereinbefore, in particular the central engagement of the transverse member 23 with the connecting elements 21. As the base unit 22 engages the members 12 to be connected, being arranged between them, the receiving space 13 of those members 12 is open upwardly and downwardly and can therefore be easily cleaned.

In the embodiment shown here of the line guiding device 1 as illustrated in FIGS. 1 through 4 provided at an end is a connecting element 16 for connection and for transfer of the lines, hoses and/or cables (not shown here) which are guided in the receiving space 13, at a usual connection point (not shown here) for displacement of the line guiding device 1. In this case the connecting element 16 is connected by means of the connecting arrangement 2 in the same manner to the adjacent member 12 as the mutually adjacent members 12. Here too the connecting element 16 and its adjacent member 12 are held at a constant spacing a from each other. This has the advantage that transfer for receiving the lines and the like can take place without a damaging mechanical loading thereof.

Figure 5:
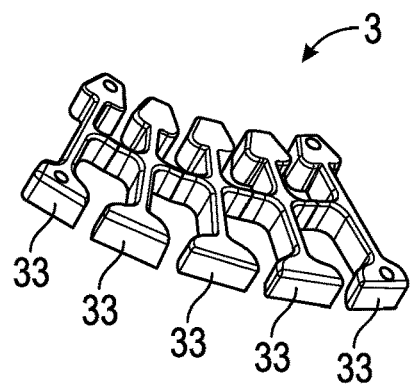
FIGS. 5 and 6 each show an individual view of a side wall segment shown in FIG. 1.
Figure 6:
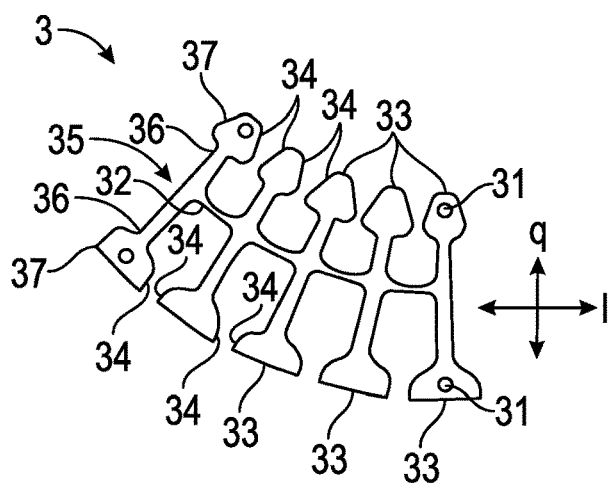

Similarly as described in detail in DE 10 2007 017 940 A1 and as can be clearly seen here in particular from FIGS. 5 and 6 the side wall segments 3 each have a connecting limb 32 which is flexible in the bending plane B, the bending axis being arranged parallel to the transverse direction q. Bending of the connecting limb 32 is limited by side portions 33 which are arranged in one piece thereon at the underside and the top side and having abutments 34 which face in the longitudinal direction 1 and which can be moved against each other to limit the bending movement. The connecting limb 32 extends in the longitudinal direction 1 of the line guiding device 1.

The side portions 33 are arranged integrally connected together by the connecting limb 32. They have a limb 35 which is T-shaped in longitudinal section and which extends substantially perpendicularly to that connecting limb 32 in the bending plane, with a foot limb 36 and a transverse limb 37, wherein the foot limb 36 is connected to the connecting limb 32 and the transverse limb 37 is arranged at an end of the foot limb 36, that is opposite to the connecting limb 32. The ends of the transverse limbs 37, that face in the longitudinal direction 1 of the line guiding device 1, form the abutments 34 for limiting the bending angle.

The connecting limb 5 is arranged in a central region with respect to the heightwise direction h.

Figure 16:
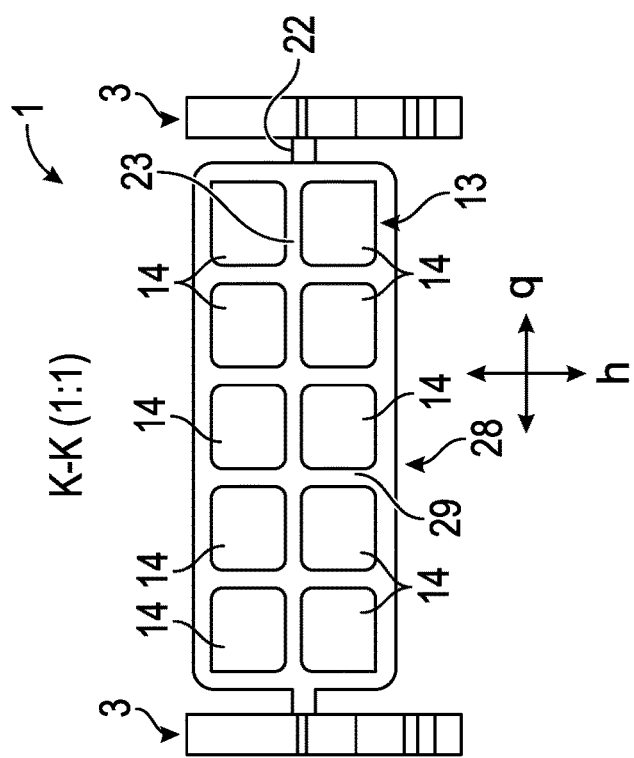
FIG. 16 shows a side view of the embodiment of the connecting arrangement of FIG. 15 in the installation position in the line guiding device.

As indicated in FIG. 11*a* the embodiment of the line guiding device 1 shown in FIGS. 9 through 11 and also as shown in FIGS. 16 and 17 can have at the end of the connecting limb 32 in addition third connecting means which are here in the form of arrow-like plug-in elements 38 and by way of which the side wall segments 3 of adjacent members 12 are pivotably connected together, in addition to the above-described forms of the connecting arrangement 2.

In the situation where there is only one base unit 22 for connecting the side wall segments 3 of adjacent members 12 the connection can be in the form of a pivotal connection with a pivotal movement in the bending plane B. That is shown by way of example in the embodiment of the line guiding device 1 shown in FIGS. 16, 17*b* and 17*c*, with the connecting arrangement 2 shown in FIGS. 15*a* through 15*c*. In this case the base unit 22 is arranged at the height of the connecting limb 32 and thus connects almost moment-free thereto in respect of transmission of force in the longitudinal direction 1. The plug-in projections 26 of the connecting elements 21 in this case respectively engage into the associated receiving opening not in frictionally locking relationship but rotatably and are axially secured against slipping out of the receiving opening. That axial securing arrangement is not specifically shown as in principle it can be of any suitable form.

Figure 17A:
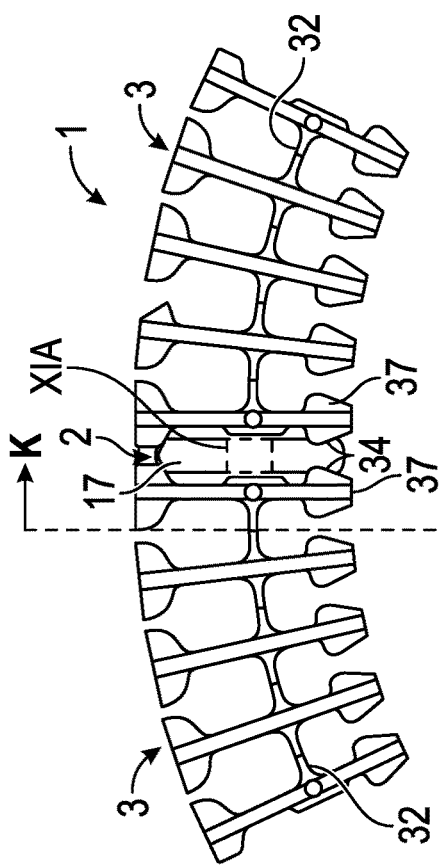
FIGS. 17a and 17b each show a side view of the line guiding device of FIG. 15, but in the unpivoted and pivoted position respectively of the side wall segments.
Figure 17B:
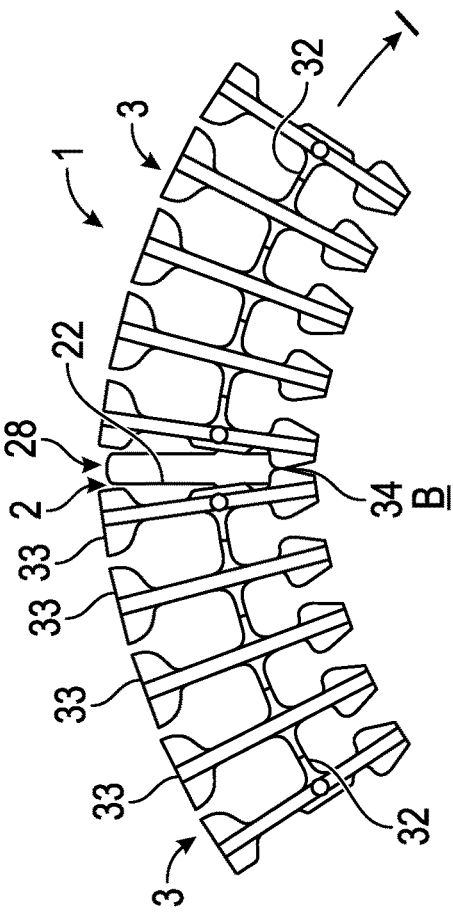

The pivotal movement of the members 12 on the base unit 22 can be clearly seen in FIGS. 16 and 17*a* with the illustration of a non-pivoted position in which the side walls 3 are arranged at the spacing a relative to each other, with the formation of a free space 17, and FIG. 17*b* with the view of a pivoted position in which the side wall segments 3 bear against the lower mutually facing abutments 34. As a consequence of the axial spacing of the projections 26 from each other, the constant spacing of the side wall segments 3 is maintained at the height of the free ends 24 or the projections 26 and, except the region of the abutments 34 which are in contact with each other, the free space 17 is maintained between the side wall segments 3.

For stabilization in particular with respect to twisting and/or buckling of the base unit 22 the arrangement has a flat frame-like bar framework disposed here at both sides of the transverse member 23, 28 with horizontal transverse members 201 and perpendicular bar framework limbs 29. The base unit 22 is thus integrated into the bar framework 28.

FIG. 11 also shows between the members 12 a rectangle XIa which is shown in broken line, referring to FIG. 11*a*. In this case that pivotal connection by way of the plug-in elements 38 as a prolongation of the connecting limb 32 serves for further securing the connection by way of the base unit 22.

LIST OF REFERENCES 1 line guiding device
12 member
13 receiving space
14 compartment
15 direction-changing arc
16 connecting member
17 free space
2 connecting arrangement
21 connecting element
22 base unit
23 transverse member
24 free end
25 limb
26 plug-in projection
27 abutment (plug-in projection)
28 bar framework
29 bar framework limb
210 transverse member
3 side wall segment
31 receiving opening
32 connecting limb
33 side portion 34 abutment
35 limb
36 foot limb
37 transverse limb
38 plug-in element
B bending plane
S mirror-image symmetry plane
a spacing
h heightwise direction
l longitudinal direction
q transverse direction

What is claimed is:

1. A connecting arrangement comprising:
   connecting elements configured to connect two separate, longitudinally adjacent members of a line guiding device to guide one or more hoses and/or one or more cables,
   wherein the two adjacent members are connectable with the connecting elements such that the two adjacent members are connected together in a row in a longitudinal direction of the line guiding device,
   wherein the two adjacent members each have two separate, connectable side wall segments arranged spaced in a transverse direction of the line guiding device and defining a receiving space as part of a line guiding passage for the one or more hoses and/or one or more cables,
   wherein, in an installation position, each of the side wall segments of one of the adjacent members are respectively connected by a connecting element of the connecting elements to an associated side wall segment of the other of the adjacent members,
   wherein the connecting elements connecting the side wall segments of the adjacent members are connected together at a mutual spacing by at least one transverse member with a formation of at least one base unit, wherein the at least one transverse member has a longitudinal extent and the longitudinal extent extends in the transverse direction of the line guiding device, and
   wherein the connecting elements of the at least one base unit are of curved shape and the curved shape of the connecting elements is a U-shape with two limbs, and wherein the two limbs are arranged in the longitudinal extent of the at least one transverse member and the two limbs are spaced in the longitudinal direction of the line guiding device.

2. The connecting arrangement as set forth in claim 1, wherein the connecting elements of the at least one base unit are arranged in a mirror-image symmetrical relationship with each other with respect to a mirror-image symmetry plane which is central and perpendicular relative to the longitudinal extent of the at least one transverse member.

3. The connecting arrangement as set forth in claim 1, wherein the at least one transverse member is arranged to extend from a central region of the connecting elements with respect to an extent of the connecting elements perpendicularly to the longitudinal extent of the at least one transverse member.

4. The connecting arrangement as set forth in claim 1, wherein the connecting elements of the at least one base unit respectively have two free ends with a first connector to connect to a second connector of the associated side wall segment, respectively.

5. The connecting arrangement as set forth in claim 1, wherein the at least one transverse member is of an oval cross-section with a larger diameter parallel to a plane defined by the at least one transverse member and the connecting elements.

6. The connecting arrangement as set forth in claim 1, wherein the at least one base unit is in one piece.

7. The connecting arrangement as set forth in claim 1, wherein the longitudinal extent extends across the receiving space.

8. The connecting arrangement as set forth in claim 1, wherein the at least one base unit comprises at least two base units which are arranged spaced from each other in a heightwise direction perpendicularly to the transverse direction.

9. The connecting arrangement as set forth in claim 8, wherein the at least two base units are fixedly connected together by a construction having a bar framework with at least one bar framework limb.

10. The connecting arrangement as set forth in claim 9, wherein the at least one transverse member comprises at least two transverse members, and the at least one bar framework limb of the bar framework comprises two bar framework limbs which are arranged connecting the at least two transverse members together.

11. The connecting arrangement as set forth in claim 9, wherein the at least two base units and the bar framework are a one-piece component.

12. A line guiding device to guide one or more hoses and/or one or more cables in a line guiding passage, comprising:
    at least two, separate, longitudinally adjacent members connected together and arranged in a row in a longitudinal direction of the line guiding device,
    wherein the adjacent members each have two separate, connectable side wall segments arranged spaced in a transverse direction of the line guiding device and defining a receiving space as part of the line guiding passage,
    wherein each of the side wall segments of one of the adjacent members are respectively connected together with an associated side wall segment of another member of the adjacent members by connecting elements,
    wherein the connecting elements connecting the side wall segments of the adjacent members are connected together by at least one transverse member with at least one base unit, wherein the at least one transverse member has a longitudinal extent and the longitudinal extent extends in the transverse direction of the line guiding device, and
    wherein the connecting elements of the at least one base unit are of curved shape and the curved shape of the connecting elements is a U-shape with two limbs, and wherein the two limbs are arranged in the longitudinal extent of the at least one transverse member and the two limbs are spaced in the longitudinal direction of the line guiding device.

13. The line guiding device as set forth in claim 12, wherein the at least one transverse member of the at least one base unit extends in the transverse direction and is arranged between the adjacent members connected by the at least one base unit.

14. The line guiding device as set forth in claim 12, wherein, with respect to a heightwise direction perpendicularly to the longitudinal direction and the transverse direction, the at least one base unit comprises a base unit arranged in a central region between the members, and/or a base unit arranged in a lower region between the members, and/or a base unit arranged in an upper region between the members.

15. The line guiding device as set forth in claim 12, wherein the side wall segments are of a flexibly bendable configuration in a bending plane perpendicularly to the transverse direction.

16. The connecting arrangement as set forth in claim 12, wherein the at least one base unit comprises at least two base units which are arranged spaced from each other in a heightwise direction perpendicularly to the transverse direction.

17. The linear guide device as set forth in claim 12, wherein the longitudinal extent extends across the receiving space.

18. The line guiding device as set forth in claim 12, wherein the connecting elements connect the side wall segments of the adjacent members together in positively locking and/or frictionally locking relationship.

19. The line guiding device as set forth in claim 18, wherein the connecting elements of the at least one base unit respectively have two free ends with a first connector to connect to a second connector of the associated side wall segments, respectively.

20. The line guiding device as set forth in claim 19, wherein the first connector is in a form of end thickened portions barbell shape or in a form of plug-in projections extending in the transverse direction, which, to form the connection, respectively engage in the transverse direction into a receiving opening which is provided as the second connector on the side wall segment and which is open in the transverse direction.

21. The line guiding device as set forth in claim 12, wherein the adjacent members are arranged at a constant spacing relative to each other with respect to the longitudinal direction.

22. The line guiding device as set forth in claim 21, wherein the constant spacing of the adjacent members is produced by the connecting elements and/or by spacer elements.

23. The line guiding device as set forth in claim 12, wherein the side wall segments have a connecting limb which is flexible in a bending plane perpendicularly to the transverse direction, and a bending of which is limited by side portions which are arranged thereon at an underside and/or a top side, with abutments which face in the longitudinal direction and which are guidable against each other to limit a bending movement.

24. The linear guide device as set forth in claim 23, wherein the at least one base unit is arranged at a height of the connecting limb.

25. The linear guide device as set forth in claim 23, wherein a connector is provided at an end of the connecting limb in a form of a plug-in element and by way of which the side wall segments of adjacent members are respectively pivotably connected together.

26. A connecting arrangement comprising:
connecting elements configured to connect two separate, longitudinally adjacent members of a line guiding device to guide one or more hoses and/or one or more cables,
wherein the two adjacent members are connectable with the connecting elements such that the two adjacent members are connected together in a row in a longitudinal direction of the line guiding device,
wherein the two adjacent members each have two separate, connectable side wall segments arranged spaced in a transverse direction of the line guiding device and defining a receiving space as part of a line guiding passage for the one or more hoses and/or one or more cables,
wherein, in an installation position, each of the side wall segments of one of the adjacent members are respectively connected by a connecting element of the connecting elements to an associated side wall segment of the other of the adjacent members,
wherein the connecting elements connecting the side wall segments of the adjacent members are connected together at a mutual spacing by at least one transverse member with a formation of at least one base unit, and
wherein the at least one base unit comprises at least two base units which are arranged spaced from each other in a heightwise direction perpendicularly to the transverse direction and which are fixedly connected together by a construction having a bar framework with at least one bar framework limb.

27. A connecting arrangement comprising:
connecting elements configured to connect two separate, longitudinally adjacent members of a line guiding device to guide one or more hoses and/or one or more cables,
wherein the two adjacent members are connectable with the connecting elements such that the two adjacent members are connected together in a row in a longitudinal direction of the line guiding device,
wherein the two adjacent members each have two separate, connectable side wall segments arranged spaced in a transverse direction of the line guiding device and defining a receiving space as part of a line guiding passage for the one or more hoses and/or one or more cables,
wherein, in an installation position, each of the side wall segments of one of the adjacent members are respectively connected by a connecting element of the connecting elements to an associated side wall segment of the other of the adjacent members,
wherein the connecting elements connecting the side wall segments of the adjacent members are connected together at a mutual spacing by at least one transverse member with a formation of at least one base unit, wherein the at least one transverse member has a longitudinal extent and the longitudinal extent extends in the transverse direction of the line guiding device,
wherein the at least one base unit comprises at least two base units which are arranged spaced from each other in a heightwise direction perpendicularly to the transverse direction, and
wherein the at least two base units are fixedly connected together by a construction having a bar framework with at least one bar framework limb.

28. A line guiding device to guide one or more hoses and/or one or more cables in a line guiding passage, comprising:
at least two, separate, longitudinally adjacent members connected together and arranged in a row in a longitudinal direction of the line guiding device,
wherein the adjacent members each have two separate, connectable side wall segments arranged spaced in a transverse direction of the line guiding device and defining a receiving space as part of the line guiding passage,
wherein each of the side wall segments of one of the adjacent members are respectively connected together with an associated side wall segment of another member of the adjacent members by connecting elements, wherein the connecting elements connecting the side wall segments of the adjacent members are connected together by at least one transverse member with at least one base unit, wherein the at least one transverse member has a longitudinal extent and the longitudinal extent extends in the transverse direction of the line guiding device, and wherein the side wall segments are of a flexibly bendable configuration in a bending plane perpendicularly to the transverse direction.

29. A line guiding device to guide one or more hoses and/or one or more cables in a line guiding passage, comprising:

at least two, separate, longitudinally adjacent members connected together and arranged in a row in a longitudinal direction of the line guiding device, wherein the adjacent members each have two separate, connectable side wall segments arranged spaced in a transverse direction of the line guiding device and defining a receiving space as part of the line guiding passage, wherein each of the side wall segments of one of the adjacent members are respectively connected together with an associated side wall segment of another member of the adjacent members by connecting elements, wherein the connecting elements connecting the side wall segments of the adjacent members are connected together by at least one transverse member with at least one base unit, wherein the at least one transverse member has a longitudinal extent and the longitudinal extent extends in the transverse direction of the line guiding device, and wherein the side wall segments have a connecting limb which is flexible in a bending plane perpendicularly to the transverse direction, and a bending of which is limited by side portions which are arranged thereon at an underside and/or a top side, with abutments which face in the longitudinal direction and which are guidable against each other to limit a bending movement.

\* \* \* \* \*